Figure 1:
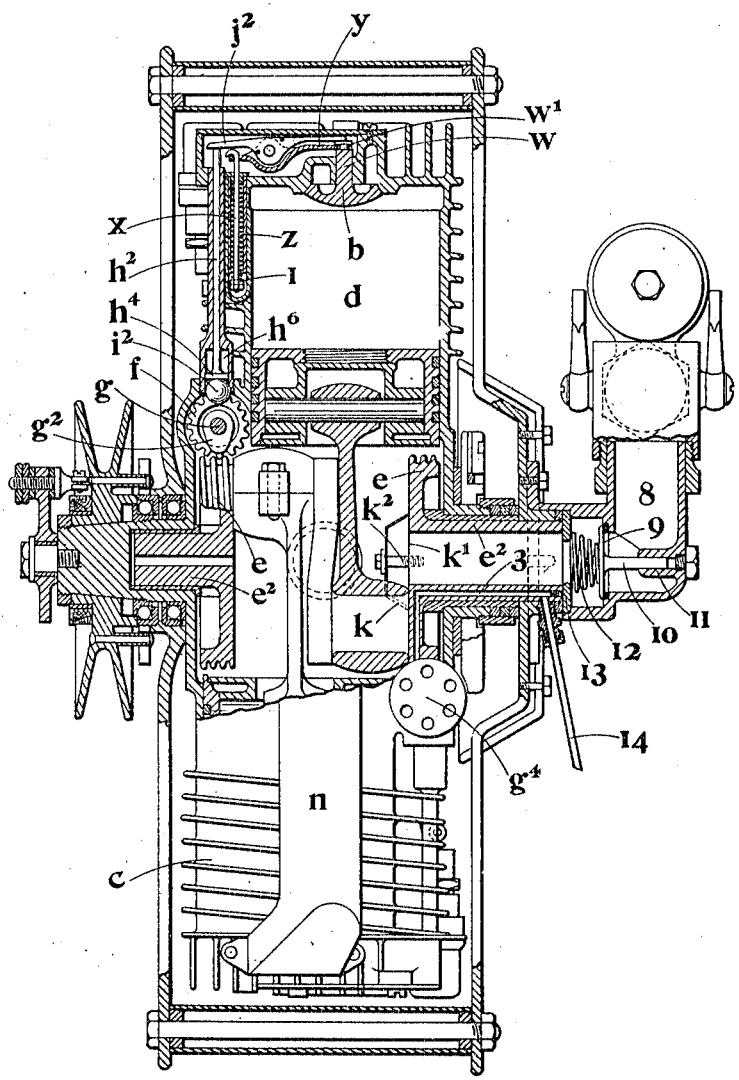

C. B. REDRUP.
MOTOR.
APPLICATION FILED MAR. 22, 1909.

999,673.

Patented Aug. 1, 1911

2 SHEETS—SHEET 1.

Witnesses.
Stanley Wood.
Herbert W. Cox.

Inventor
Charles B. Redrup.
by
W. E. Evans.
Attorney

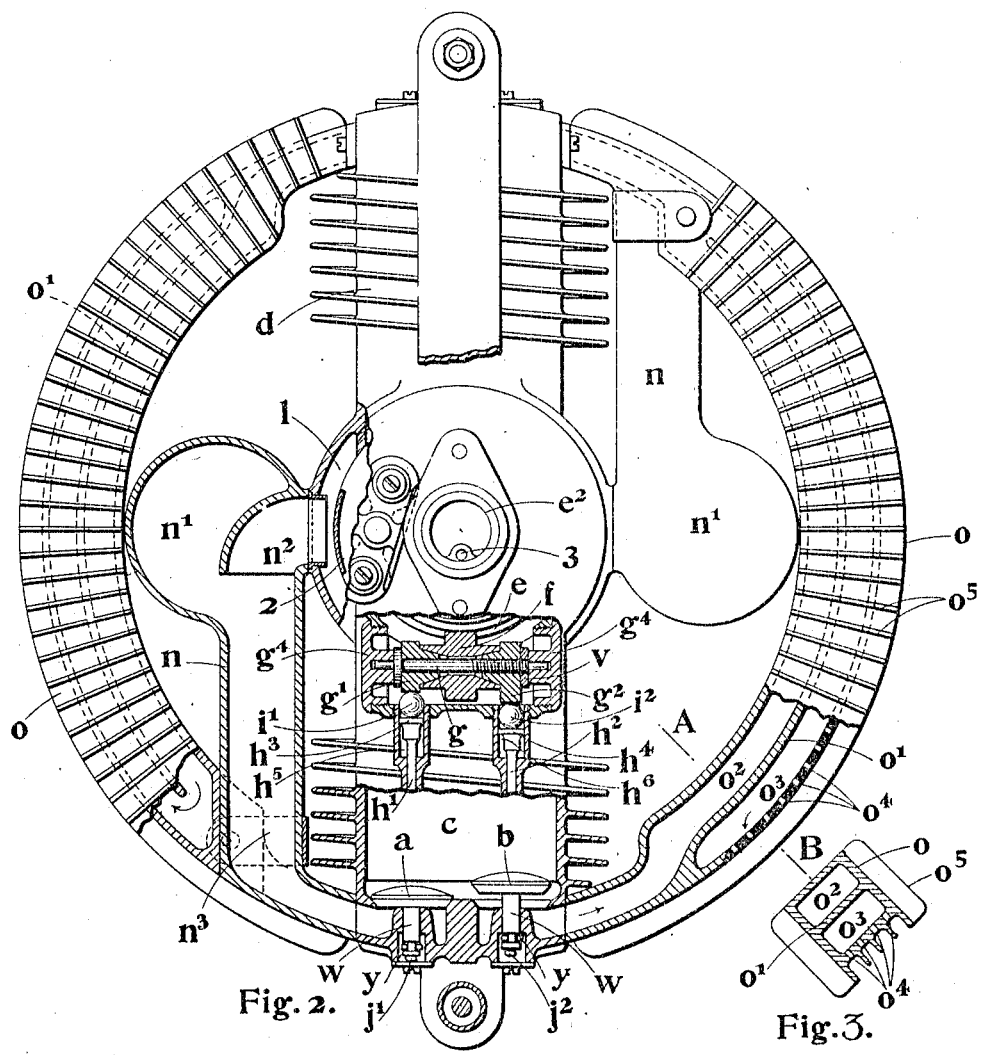

BEST AVAILABLE COPY

UNITED STATES PATENT OFFICE.

CHARLES BENJAMIN REDRUP, OF BARRY DOCK, ENGLAND.

MOTOR.

999,673.  Specification of Letters Patent.  Patented Aug. 1, 1911.

Application filed March 22, 1909. Serial No. 485,144.

*To all whom it may concern:*

Be it known that I, CHARLES BENJAMIN REDRUP, a subject of the King of Great Britain and Ireland, residing at 22 Guthrie street, Barry Dock, Glamorganshire, England, motor mechanic, have invented certain new and useful Improvements in and Relating to Motors, of which the following is a specification.

This invention relates to improvements in rotary motors particularly of the type described in the specification of prior Letters Patent of the United States No. 857,536 granted to me and the invention has for its object to render the construction more effective and the operation of the engine more efficient.

The invention is illustrated in the accompanying drawing in which—

Figure 1 is a sectional elevation of a rotary motor provided according to my invention, Fig. 2 is a front elevation partly in section, Fig. 3 is a sectional elevation on the line A—B of Fig. 2.

According to the invention I provide means for operating each set of valves $a$ $b$ of the respective cylinders $c$ and $d$ of the rotary motor, consisting of a two-to-one skew gear $e$ $f$ which causes the rotation of a cam shaft $g$ upon which cams $g'$ $g^2$ are mounted, that periodically cause the reciprocation of rods $h'$ $h^2$ mounted upon the cylinder or casing and advantageously parallel with the center line thereof, with their opposite extremities respectively disposed beneath or connected to valve operating levers $j'$ $j^2$ so that thus on the reciprocation of the rod $h'$ or $h^2$ effected on the rotation of the cam $g'$ or $g^2$ the valve lever $j'$ or $j^2$ is operated to open the corresponding valve.

For the purpose of taking up the wear of the cams on the cam shaft I prefer to provide the cam shaft $g$ with a screw thread and the gear wheel $f$ mounted thereon with bosses having internal conical recesses. The cams $g'$ $g^2$ are provided with conical bosses fitting within the internal conical recesses of the gear wheel $f$. One of the cams is provided with a screw thread and screwed upon the cam shaft $g$ and behind this cam is screwed a lock nut $v$. The other cam is loosely mounted upon the shaft and the two cams are drawn into the conical recesses of the gear wheel $f$ by the nut $v$ screwed upon the cam shaft. By these means it will be seen that the position of the cams $g'$, $g^2$ in relation to one another can be varied.

I prefer to form the inner extremity of the rod $h'$ or $h^2$ as a piston $h^3$ or $h^4$ and to mount the piston $h^3$ or $h^4$ to reciprocate within a small cylinder or casing $h^5$ or $h^6$ in the end of which a ball $i'$ or $i^2$ is mounted which contacts with the cam $g'$ or $g^2$ so that by such means the contact of the cam $g'$ or $g^2$ with the ball $i'$ or $i^2$ is a wiping contact causing the rotation of the ball and involving little friction and noise.

For the purpose of preventing the valves $a$ $b$ from falling into the piston cylinders I provide their spindles $w$ with a circular groove $w'$ around which passes the forked arm of lever $y$ which is pivoted on the same pin as the levers $j'$ $j^2$. The lever $y$ operating upon the exhaust valve $b$ is prolonged beyond the pivot and is in connection with a rod $x$ acted upon by a spring $z$ of which the tension is adjusted by nuts I. The tension in this spring is such that it continually tends to keep the valve $b$ closed.

It will be understood that one member $e$ of the skew gear may be conveniently mounted on the spindle or trunnion $e^2$ upon which the cylinders $c$ $d$ rotate. According to the invention, moreover, I provide a baffle plate $k$ suitably fixed in front of the aperture $k'$ or port in the hollow crank shaft within the crank chamber through which the gas is drawn in, so as to prevent the petrol vapor from washing the crank shaft bearings and in order also to spread the incoming gases against the walls of the crank chamber. This baffle plate is perforated near its edges as illustrated and is secured in position on each side of the aperture $k'$ by bolts $k^2$ as illustrated.

Between the hollow crank shaft $e^2$ and the pipe 8 leading to the carbureter is provided a nonreturn valve 9 of which the spindle 10 is guided in a sleeve 11. This valve 9 is kept closed by a spring 12 provided between the valve 9 and a washer 13 which latter forms an air tight joint between the hollow crank shaft $e^2$ and the pipe 8.

The pipe 8 leading from the carbureter is provided with a slot so as to permit of its being passed over the pipe 14 adapted for the supply of oil to the hole 3 in the hollow crank shaft. For the supply of oil the hollow crank shaft is provided with a hole 3, for which purpose, as the said shaft must be capable of resisting the twisting effort, it is thickened in the manner shown. According to the invention, moreover, I provide in a twin cylinder rotary motor of the type referred to, two storage chambers $n$ $n$ independent of each other and communicating with the common crank chamber. These storage chambers $n$ $n$ conveniently each takes the form of a spherical space $n'$ centrally provided advantageously in line with the center of the crank chamber on each side thereof, such space communicating with the crank chamber by means of a central tubular part $n^2$ which preferably protrudes into the space $n'$ referred to and alines with a corresponding central aperture provided on the respective side of the crank chamber.

The upper space $n'$ referred to provided in the storage chamber $n$ communicates by means of a suitable passage $n^3$ disposed preferably parallel with the axis of the cylinder with the inlet valve box or with the space surrounding the inlet valve $a$. It will thus be understood that a storage chamber $n$ so formed is provided on each side of the twin cylinder engine, they being oppositely disposed one to the other and communicating as described with the respective inlet valve boxes or with the passages leading to the respective inlet valves $a$. For the purpose of preventing any oil from entering the tubular part $n^2$ this is projected into the crank casing and a plate 2 is placed some distance in front thereof for the purpose of preventing any oil from dripping therein, during the rotation of the engine.

According to the invention in the provision of a twin cylinder engine I provide two exhaust silencers $o$ of curvilinear form disposed one on each side of the respective cylinders $c$ $d$ so as together with the heads of the respective cylinders to complete a circle. These respective exhaust silencers $o$ are connected at one end to communicate with the space surrounding the respective exhaust valves $b$ and each has a central curvilinear dividing diaphragm $o'$ by which a chamber $o^2$ $o^3$ is formed of a length double that of the exhaust silencer, the exhaust passing first throughout the length of the silencer through one compartment $o^2$ and then passing the length of the silencer in the opposite direction through the other compartment $o^3$ whence it issues out at the periphery thereof through holes $o^4$ provided for the purpose. It will be understood that an exhaust silencer so provided may be formed with radiating gills or ribs $o^5$ and may be otherwise of any suitable form for the purpose.

The operation of the engine is as follows. The combustible charge is admitted from the carbureter through the hollow crank shaft into the crank chamber from where it passes to one of the inlet valves $a$ by means of one of the storage chambers $n$. After the compression and explosion of the charge the outlet valve $b$ is opened by the skew gear and the exhaust gases pass into the silencer $o$ and along the passage $o^2$ thereof to the end of the silencer, and then pass along the passage $o^3$ and exhaust through the openings $o^4$ provided on one side of said passage $o^3$.

What I claim as my invention and desire to secure by Letters Patent is.—

1. The combination with a rotary motor of the rotating cylinder type comprising cylinders, a crank chamber intermediate of said cylinders, a carbureter and a hollow crank shaft connecting the crank chamber to the carbureter of a baffle plate in front of the aperture or port in the hollow crank shaft leading into the crank chamber.

2. The combination with a rotary motor of the rotating cylinder type comprising cylinders, a crank chamber intermediate of said cylinders, a carbureter, and a hollow crank shaft connecting the crank chamber to the carbureter of a baffle plate fixed in front of the aperture or port in the hollow crank shaft leading into the crank chamber, said baffle plate being perforated, and means for securing said baffle plate in front of the aperture in the hollow crank shaft.

3. In a twin cylinder rotary motor, cylinders, inlet and outlet valves in said cylinders, said cylinders having a space around each inlet valve, means for the compression of the charge before admission to the respective cylinders, consisting of pistons within said cylinders, a crank chamber, a storage chamber for each cylinder, said storage chamber having a spherical end, a tube extending from the crank chamber into the spherical end of the storage chamber and means of communication between the said spherical part and the space surrounding the respective inlet valve.

4. A twin cylinder rotary motor comprising cylinders, inlet and outlet valves in said cylinders said cylinders having a space around each inlet valve and being adapted to rotate about an axis at right angles to the longitudinal axes of said cylinders, a crank chamber; said crank chamber being provided with openings in diametrically opposite positions and transverse to the axis of rotation of the cylinders for the passage therethrough of the combustible charge, a storage chamber on each side of said crank chamber, said storage chambers having apertures registering with those in the crank chamber, and means of communication between the said storage chambers and the spaces surrounding the respective inlet valves.

5. A twin cylinder rotary motor comprising cylinders, inlet and outlet valves in said cylinders, said cylinders having a space around each inlet valve and being adapted to rotate about an axis perpendicular to the longitudinal axes of said cylinders, a crank chamber, said crank chamber being provided with openings in diametrically opposite positions and transverse to the axis of rotation of the cylinders for the passage therethrough of the combustible charge, a storage chamber on each side of said crank chamber, each of said storage chambers having a spherical end, said storage chambers having apertures registering with those in the crank chamber and means of communication between the said storage chambers and the spaces surrounding the respective inlet valves.

6. In a twin cylinder rotary motor of the rotating cylinder type, the engine shaft, cylinders disposed radially on diametrically opposite sides of the shaft, an exhaust silencer of substantially semi-circular form disposed on each side of the respective cylinders so as with the heads of the cylinders to complete a circle, valve chambers provided in the cylinders, exhaust valves, means of communication between the exhaust valve chambers and the exhaust silencers, said exhaust silencers each being provided with a curved diaphragm separating the silencer into two parts, mans of communication between the two parts of each silencer and means permitting the exhaust of the gases from the silencer provided on the outer side of the silencer so that the gases can exhaust at the periphery of the silencer.

In testimony whereof I have hereunto signed my name to this specification in the presence of two subscribing witnesses.

CHARLES BENJAMIN REDRUP.

Witnesses:
WM. FORCE STEAD,
THOS. H. COOK.